United States Patent [19]
Pattison

[11] 3,876,654

[45] Apr. 8, 1975

[54] FLUOROELASTOMER COMPOSITION

[75] Inventor: Dexter Brayton Pattison, Wilmington, Del.

[73] Assignee: E. I. du Pont de Nemours and Company, Wilmington, Del.

[22] Filed: Feb. 28, 1972

[21] Appl. No.: 230,100

Related U.S. Application Data

[63] Continuation-in-part of Ser. No. 101,170, Dec. 23, 1970, abandoned, which is a continuation-in-part of Ser. No. 44,883, June 9, 1970, abandoned.

[52] U.S. Cl. ... 260/30.4 R; 260/31.2 R; 260/32.8 R; 260/42.27; 260/47 R; 260/47 JA; 260/80.77; 260/87.7

[51] Int. Cl. ..................... C08f 45/00; C08f 45/34

[58] Field of Search .............. 260/38, 87.7, 60.65 F, 260/60.65 P, 469, 440, 30.4, 470 P, 87.7, 80.77, 30.4 R, 31.4 R, 32.8 R, 47 R, 47 UA

[56] References Cited
UNITED STATES PATENTS 3,088,938   4/1963   Cluff.................................. 260/87.7
3,243,411   3/1966   Tawney................................ 260/61
3,524,836   8/1970   Barney............................. 260/80.77

*Primary Examiner*—Stanford M. Levin

[57] ABSTRACT

A fluoroelastomer composition which has beneficial utility in the manufacture of cured fluoroelastomer articles having good resistance to compression set can be prepared by blending the following components: (A) an elastomeric copolymer of vinylidene fluoride and another fluorinated monomer, and (B) as a vulcanization accelerator, a certain quaternary phosphonium compound (for example, benzyl triphenyl phosphonium bromide or -chloride), or a corresponding compound of arsenic or antimony; and when making the cured articles, it is also preferred to add (C) a suitable metal compound such as a divalent metal oxide or hydroxide and optionally a metal salt of a weak acid, and (D) a cross-linking agent composed of a suitable polyhydroxylic-aromatic compound, for example hexafluoroisopropylidene-bis(4-hydroxybenzene).

11 Claims, No Drawings ic ether. Still other usable component A copolymers

FLUOROELASTOMER COMPOSITION

CROSS-REFERENCE TO RELATED APPLICATIONS

This is a continuation-in-part of patent application Ser. No. 101,170 filed Dec. 23, 1970; Ser. No. 101,170 was a continuation-in-part of patent application Ser. No. 44,883 filed on June 9, 1970 both now abandoned.

BACKGROUND OF THE INVENTION

This invention concerns a useful fluoroelastomer composition and a process for curing a fluoroelastomer composition.

Highly fluorinated elastomers have found increasing application in specialized areas, such as high temperature-resistant gaskets, seals, diaphragms, and tubing. Fabricated fluoroelastomer articles can withstand temperatures of about 250°–350°C. while retaining their good elasticity.

It is necessary for many applications, for example gaskets for high-temperature reactors, that the fluoroelastomer article be resilient and have low compression set. This is accomplished by curing the article; that is, by vulcanizing or cross-linking the elastomer.

Prior art processes for vulcanization of fluoroelastomers use mainly aliphatic diamines as cross-linking agents, or they carry out free radical-initiated vulcanization in the presence of organic peroxides or high energy radiation. The diamines generally are too scorchy for practical application, and more recently they have been replaced by carbamates or aminocarbamic acids. Organic peroxides tend to provide fast gelation, and compounded stocks consequently do not have the required processing safety. High energy radiation is a slow process which does not always lead to a fully cured material. In addition, this process is quite expensive. There is a need, therefore, for a fluoroelastomer vulcanization process which combines satisfactory cure rates with good processing safety and good storage stability of unvulcanized formulations; and which yields vulcanized polymers of good stress/strain properties and low compression set.

SUMMARY OF THE INVENTION

Expressed broadly, the present invention provides a fluoroelastomer composition comprising A. an elastomeric copolymer of vinylidene fluoride and at least one other fluorinated monomer, and B. as a vulcanization accelerator, a compound of the formula

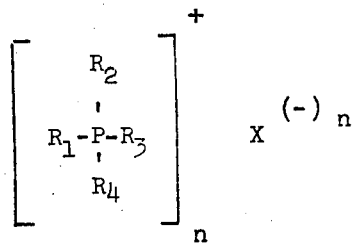

wherein P is selected from the group: phosphorous, arsenic, and antimony; $R_1$, $R_2$, $R_3$, and $R_4$ are selected individually from the group: $C_1$–$C_{20}$ alkyl, aryl, aralkyl, alkenyl, and the chlorine, fluorine, bromine, cyano, —OR, and —COOR substituted analogs thereof, R being selected from the group: $C_1$–$C_{20}$ alkyl, aryl, aralkyl, and alkenyl; and X is selected from the group: halide, sulfate, sulfite, carbonate, pentachlorothiophenolate, tetrafluoroborate, hexafluorosilicate, hexafluorophosphate, dimethyl phosphate, and $C_1$–$C_{20}$ alkyl-, aryl-, aralkyl-, and alkenyl-/-carboxylate and dicarboxylate: $n$ is 1 or 2 and equal to the valence of the anion X.

The invention also provides a process which comprises providing a mixture comprised of components A and B as described in the preceding paragraph, and curing the resulting mixture; preferably a suitable metal compound and cross-linking agent are added to the mixture prior to the curing operation.

DESCRIPTION OF PREFERRED EMBODIMENTS

Especially preferred embodiments of the invention employ a component B accelerator wherein P is phosphorous. However, this quaternary phosphonium compound can be replaced partially or entirely with the corresponding arsonium or stibonium compound.

The composition composed of components A and B is a useful article of commerce which (as in the case of a novel polymer) can be supplied to manufacturers of fabricated fluoroelastomer articles who wish to modify the material (e.g., with certain metal compounds and cross-linking agents) according to the requirements of particular end products before they carry out the curing operation. Another useful approach is for the supplier of the fluoroelastomer composition to add one or both of the following components before the composition is delivered to the person who makes the cured articles:

(Component C) a metal compound selected from the group consisting of divalent metal oxides, divalent metal hydroxides and mixtures of such oxides or hydroxides with metal salts of weak acids.

(Component D) a polyhydroxylic aromatic compound cross-linking agent for the copolymer.

In the majority of applications, the curable composition used by the person who makes the cured articles preferably contains, for each 100 parts by weight of the component A copolymer, about 1–15 parts by weight of the component C metal compound, about 0.1–5.0 parts by weight of the component D polyhydroxylic compound and about 0.1–3.0 parts by weight of the component B vulcanization accelerator; especially preferred is a component C content of about 2–10 parts, a component D content of about 0.6–2 parts and a component B content of about 0.2–0.8 part per 100 parts of copolymer.

Among the most useful component A elastomeric copolymers are: copolymers of vinylidene fluoride and hexafluoropropylene, chlorotrifluoroethylene or pentafluoropropylene, and copolymers of vinylidene fluoride, tetrafluoroethylene and hexafluoropropylene or pentafluoropropylene. "Copolymer" herein means the product of copolymerizing two or more monomers. Especially preferred are vinylidene fluoride/hexafluoropropylene copolymers in which the monomers are combined in a molar ratio of about 85:15 to 50:50. Component A can also be any other vinylidene fluoride copolymer fluoroelastomer which can be cured to useful products, for example copolymers of vinylidene fluoride with dichlorodifluoroethylene or chlorofluoroethylene, with fluorinated vinyl esters, with derivatives of perfluoroacrylic acid, and with fluorinated alkyl vinyl ethers; the latter can be illustrated by copolymers of vinylidene fluoride and a perfluoroalkyl perfluorovinyl ether as described in U.S. Pat. No. 3,136,745, and copolymers of vinylidene fluoride, tetrafluoroethylene and said ether as described in U.S. Pat. No. 3,235,537. Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106. The "other fluorinated monomer" of component A is preferably an ethylenically unsaturated monomer containing at least as many fluorine atoms as carbon atoms.

Component C of the composition is a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1–70 percent by weight of the metal salt. Among the useful metal salts of weak acids are barium-, sodium-, potassium-, lead-, and calcium-/-stearate, -benzoate, -carbonate, -oxalate, and -phosphite. The amount of the metal compound added generally is about 1–15 parts by weight per 100 parts of fluoroelastomer, about 2–10 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound.

The metal compound serves a dual purpose. It absorbs certain gaseous and acidic materials which are evolved during vulcanization and can chemically attack and weaken the fluoroelastomer. It also provides a long term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

Component D of the novel curable composition can be selected from known polyhydroxylic aromatic compounds capable of functioning as a cross-linking agent for the elastomeric copolymer. For example, the component D cross-linking agent can be any one of the following: di-, tri-, and tetrahydroxybenzenes, naphthalenes, and anthracenes, and bisphenols of the formula

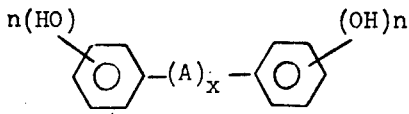

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxylic compound is optionally substituted with at least one atom of chlorine, fluorine, or bromine, a —CHO group, or a carboxyl or acyl radical (e.g., a —COR where R is OH or a $C_1$–$C_8$ alkyl, aryl, or cycloalkyl group). It will be understood from the above bisphenol formula that the —OH groups can be attached in any position (other than number one) in either ring. Blends of two or more such compounds can also be used.

Referring to the bisphenol formula shown in the previous paragraph, when A is alkylene, it can be for example methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

In an especially preferred composition of the present invention for the manufacture of cured articles having unexpectedly superior retention of useful compression set properties when subjected to compression at high temperatures for extended periods of time, the component B accelerator is an alkyl or aralkyl triarylphosphonium compound, and the component D cross-linking agent is a compound selected from the group:

dihydroxy-, trihydroxy- and tetrahydroxy- -benzenes, -naphthalenes and -anthracenes having an aromatic ring which bears an electron-withdrawing substituent, and bisphenols of the formula

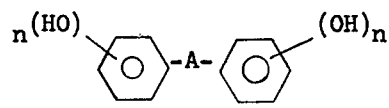

wherein A is an electron-withdrawing group, and n is 1 or 2.

In the highly preferred composition described in the previous paragraph, the electron-withdrawing group A of the bisphenol formula is preferably carbonyl, sulfinyl, sulfonyl, perfluorinated alkylene or perfluorinated alkylidene. The component B accelerator is preferably benzyl triphenyl phosphonium chloride or benzyl triphenyl phosphonium bromide. The component D cross-linking agent is preferably a compound having an oxidation potential of about 1.6–2.2 volts. The oxidation potential of component D can be conveniently measured in the manner described in G. E. Penketh in "J. Appl. Chem." Vol. 7, page 512 (1957) except using acetonitrile as the solvent and using 0.1 molar tetramethyl ammonium perchlorate as the supporting electrolyte.

One highly preferred component D cross-linking agent is hexafluoroisopropylidene-bis(4-hydroxybenzene), which has an oxidation potential of 2.07 volts. A second preferred cross-linking agent is 4,4'-dihydroxydiphenyl sulfone, which has an oxidation potential of 1.92 volts. A third preferred cross-linking agent is 4,4'-dihydroxy-benzophenone, which has an oxidation potential of 1.78 volts. Another very useful cross-linking agent is 2,4-dihydroxybenzophenone, especially when the preferred composition described above is to be used in applications requiring a rapid rate of cure plus good compression set properties at a relatively low cross-linking agent content, but not requiring the lowest possible compression set values. Other useful component D cross-linking agents are illustrated by hydroquinone; by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; and by such compounds as 1,5-dihydroxynaphthalene and 9,10-dihydroxyanthracene. Others are illustrated in the samples below.

Useful curable compositions can be made by replacing all or part of component D with one or more other compounds known to be capable of functioning as a cross-linking agent for the component A copolymer. Known, but not preferred, cross-linking means are mentioned above in the "Background of the Invention."

An essential ingredient of the novel composition is the component B accelerator.

Cross-linking of highly fluorinated polymers with aromatic polyhydroxylic compounds must be carried out in the presence of a catalyst. Catalysts which accelerate vulcanization or curing of elastomers are generally referred to as "vulcanization accelerators." According to this invention, it is an important feature of the process to employ a quaternary compound of P, As or Sb as described above as the vulcanization accelerator. It is quite unexpected that this compound functions so effectively as a vulcanization accelerator for a fluoroelastomer in the presence of components C and D, with some of the best results of the invention being obtained with a component B content of only about 0.2–0.8 part per 100 parts of the elastomer.

Particularly preferred accelerators are benzyl triphenyl phosphonium chloride and -bromide, used either alone or blended with about 1–50 percent of another component B compound within the description set forth above, based on the total weight of accelerator. Other useful component B accelerators are illustrated as follows: methyl trioctyl phosphonium tetrafluoroborate, tetraphenyl phosphonium bromide and -chloride, benzyl trioctyl phosphonium bromide and -chloride, methyl trioctyl phosphonium acetate, methyl trioctyl phosphonium dimethyl phosphate, methyl trioctyl phosphonium chloride, methoxyethyoxyethyl trioctyl phosphonium chloride, tetraoctyl phosphonium bromide, butyl trioctyl phosphonium bromide, 1-carbethoxyethyl triphenyl phosphonium chloride, tetrabutyl phosphonium chloride, 2,4-dichlorobenzyl triphenyl phosphonium chloride, m-trifluoromethylbenzyl trioctyl phosphonium chloride, 2,2,3,3-tetrafluoropropyl trioctyl phosphonium chloride, 2,2,3,3,4,4,5,5-octafluoropentyl trioctyl phosphonium chloride, isobutyl triphenyl phosphonium bromide, 2-pentyl triphenyl phosphonium bromide, methyl triphenyl arsonium tetrafluoroborate, tetraphenyl stibonium bromide, tetraphenyl arsonium chloride, benzyl triphenyl arsonium chloride, p-methyl benzyl triphenyl arsonium bromide, allyl triphenyl arsonium bromide, 4-methylbenzyl triphenyl phosphonium chloride, 4-chlorobenzyl triphenyl phosphonium chloride, diphenylmethyl triphenyl phosphonium chloride, m-trifluoromethylbenzyl triphenyl phosphonium chloride, 1-naphthylmethyl triphenyl phosphonium chloride, 2-cyanobenzyl triphenyl phosphonium bromide, 4-cyanobutyl triphenyl phosphonium bromide, α-carbethoxybenzyl triphenyl phosphonium bromide, carbethoxymethyl triphenyl phosphonium bromide, methoxymethyl triphenyl phosphonium chloride, allyloxymethyl triphenyl phosphonium chloride, allyl triphenyl phosphonium chloride, and tetrabutyl phosphonium bromide.

A typical component B accelerator (benzyl trioctyl phosphonium chloride) can be prepared by (1) providing a mixture of 37.0 grams trioctyl phosphine, 25.2 grams benzyl chloride, and 20 ml. methanol; (2) heating the mixture under nitrogen at 84°–90°C. under reflux for 11 hours; (3) removing methanol and unreacted benzyl chloride by distillation with 100 ml. of water; (4) removing water by means of a separatory funnel; (5) drying the resulting crude product (benzyl trioctyl phosphonium chloride) by exposing it to dry air in a laboratory hood for 16 hours at 25°C. and then heating it for 4 hours at 55°C. under a subatmospheric pressure of about 2 mm. of mercury. The preparation of phosphonium compounds useful as the component B accelerator is described by Davies and Lewis in J. Chem. Soc. 1934, 1959, and by Henderson and Buckler in J. Am. Chem. 82, 5794 (1960). Useful arsonium compounds can be prepared by the method described by Blicke, Willard and Taras, J. Am. Chem Soc., 61, 88–90 (1939), and by Krohnke, Chem. Ber. 83, 291–6 (1950). Useful compounds of antimony can be prepared in a similar manner.

Before component B is blended with the other ingredients of the composition, it is often desirable to combine it (e.g., by mixing in a mortar and pestle) with fine particles of a solid material that undergoes no harmful reaction with component B or with any of the other ingredients. For example, it can be combined in adsorbed or absorbed relationship with finely divided calcium carbonate, calcium silicate, silica or the like to form composite accelerator particles.

Compositions of this invention can contain component B as the sole accelerator, or they can contain blends of component B with one or more compounds already known to be capable of functioning as vulcanization accelerator for the component A copolymer.

Components B, C, and D can be mixed with the elastomeric copolymer by means of any mixing apparatus known to be useful for preparing rubber compositions, for example a roller-type rubber mill or a Banbury mixer. Known fillers, pigments, pore-forming agents and other additives can also be blended with the composition.

The initial curing of the curable composition is preferably carried out by heating the composition for about 3–30 minutes at about 149°–204°C.; conventional rubber-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 204°–260°C. One skilled in the art will realize that the best curing time and temperature for a particular application will depend on such factors as the nature and proportion of ingredients and the properties needed in the final product. The exact nature is not yet known of the chemical reaction involving the accelerator during curing of the present composition, and the accelerator reaction products present in the cured material.

The mixture of components A and B, and preferably also of components C and D, can be mixed with a solvent for component A to form a liquid composition useful in the preparation of adhesive layers, coatings, films, and the like. Among the preferred solvents are acetone, methylethyl ketone, ethyl acetate, amyl acetate, and tetrahydrofuran. Unexpectedly, substantially insoluble coatings can be prepared by air drying the coated article at such mild temperatures as about 22°–30°C.

The novel composition has beneficial utility in the manufacture of cured fluoroelastomer articles having low compression set; it is very useful for the production of heat-resistant, resilient O-ring seals, shaft seals, gaskets, tubing and the like. The invention can be employed to manufacture such articles while achieving the additional advantages of rapid cure, improved storage stability (especially when the uncured composition must be exposed to warm, humid air), better flow properties resulting from the absence of premature gelation, and satisfactory stress/strain properties.

EXAMPLES 1–3

These examples, and the others which follow, are given for the purpose of illustrating the invention. All quantities shown are on a weight basis unless otherwise indicated.

Three fluoroelastomer compositions of the present invention are prepared, cured and tested; the formulas and test results are shown below in Table I. The compositions differ from each other with respect to the amount of accelerator added. These compositions have the beneficial utility described in the paragraph just before the examples.

TABLE I

| Example | 1 | 2 | 3 |
|---|---|---|---|
| Fluoroelastomer | 100 | 100 | 100 |
| Magnesia (Maglite D) | 3 | 3 | 3 |
| Calcium hydroxide | 6 | 6 | 6 |
| Carbon black | 30 | 30 | 30 |
| Accelerator | 0.66 | 0.60 | 0.54 |
| Hydroquinone | 0.8 | 0.8 | 0.8 |
| Mooney Scorch Test-1 | | | |
| Minimum | 42 | 42 | 42 |
| Minutes to 5-point rise | 19 | 23 | 30+ |
| Mooney Scorch Test-2 | | | |
| Minimum | 48 | 45 | 43 |
| Minutes to 5-point rise | 9 | 9 | 20 |
| Minutes to 10-point rise | 10 | 11 | 26 |
| ODR Cure Test | | | |
| 2.5 | 6 | 5 | 4 |
| 5 | 30 | 22 | 6 |
| 7.5 | 85 | 83 | 18 |
| 10 | 92 | 93 | 52 |
| 15 | 96 | 96 | 86 |
| 30 | 99 | 98 | 92 |
| After Press/Heat Cycle-2 | | | |
| Shore hardness | 72 | 70 | 69 |
| Modulus-100%, psi | 720 | 700 | 640 |
| Tensile strength, psi | 1200 | 1500 | 1500 |
| Elongation at break, % | 140 | 180 | 180 |
| Compression set test-1 | 18 | 21 | 20 |
| Compression set test-1B | 12 | 10 | 14 |
| Compression set test-2 | 19 | 19 | 19 |

The table shows the amount of each ingredient in parts by weight. In each of the Table I compositions, the fluoroelastomer is a vinylidene fluoride/hexafluoropropylene 60:40 copolymer whose Mooney Viscosity (ML-10 at 100°C.) is 60. The type of carbon black is Thermax MT. The accelerator is BTPC (benzyl trioctyl phosphonium chloride) absorbed on calcium silicate (Microcel E), the weight ratio of the BTPC to calcium silicate being about 67:33.

Referring to Table I: The compositions are prepared by blending the ingredients on a 2-roll mill whose rolls are at about 25°C. Mooney Scorch Test (1) is performed at 121°C. on the freshly-prepared composition, using ASTM Method D-1646–63. Mooney Scroch Test (2) is performed by the same method on a sample of the composition which has been aged for three days at about 38°C. and 100 percent relative humidity. The Scorch Test values in the table show the processing safety of the compositions. Regarding the ODR Cure Test, which indicates the rate of cure, an oscillating disc rheometer is used at about 168°C. in a process which comprises oscillating a grooved biconical disc through an arc while pressed tightly between two pieces of the sample to measure relative viscosity, and, at certain intervals as the curing proceeds (the curing time in minutes shown in the left column), reporting the amount of torque (inch-pound readings in the numbered example columns) required to oscillate the disc as a measure of viscosity. One can use the resulting data to prepare curing curves by plotting viscosity values against time; the rate of cure is indicated by the slope of the curve at its steepest point.

Shore hardness (Durometer A) is tested by ASTM Method D-676. In Press/Heat Cycle-2, the samples are press-cured for 10 minutes at about 168°C. and post-cured in an oven at about 232°C. for 24 hours. A total pressure of about 40,000 pounds is used in making the press-cured samples. Post-curing is done in an oven in which a blower circulates the air. The modulus, tensile and elongation values are obtained at room temperature by ASTM Method D-412–66. Compression set test-1 values are obtained by ASTM D-395–61 Method B, using one inch by 0.139 inch O-rings as test samples, and conducting the test at about 204°C. for 70 hours. Compression set test-1B values are obtained in the same manner except the temperature is 25°C. Compression set test-2 values are obtained in the same manner as in test-1 except the O-rings are replaced with Yerzley Resilience Pellets, the pellets having a thickness of 0.50 inch and a diameter of 0.75 inch.

EXAMPLES 4–7

The four useful fluoroelastomer compositions shown in Table II are prepared and tested to illustrate the use of other accelerators within component B as described above. The accelerators used in Table II are as follows:

| Example | Accelerator-active ingredient |
|---|---|
| 4 | methyltrioctyl phosphonium dimethyl phosphate |
| 5 | methyltrioctyl phosphonium chloride |
| 6 | methyltrioctyl phosphonium acetate |
| 7 | methyltrioctyl phosphonium tetrafluoroborate |

The amount of accelerator in each composition shown in Table II is the amount of the active ingredient listed above, although added as a composite material having in each 100 parts thereof about 67 parts of the active ingredient absorbed on 33 parts of calcium silicate.

TABLE II

| Example | 4 | 5 | 6 | 7 |
|---|---|---|---|---|
| Composition | | | | |
| Fluoroelastomer | 100 | 100 | 100 | 100 |
| Magnesia | 3 | 3 | 3 | 3 |
| Calcium hydroxide | 6 | 6 | 6 | 6 |
| Carbon black | 30 | 30 | 30 | 30 |
| Accelerator | 0.48 | 0.33 | 0.40 | 0.40 |
| Hydroquinone | 1.0 | 1.0 | 1.0 | 0.8 |
| ODR Cure Test | | | | |
| 5 | | 79 | 6 | 18 | 26 |
| 10 | 106 | 75 | 82 | 103 |
| 15 | 108 | 89 | 90 | 106 |
| 20 | 109 | 92 | 93 | 108 |
| 30 | 110 | 95 | 96 | 110 |
| After Press/Heat Cycle-2 | | | | |
| Modulus-100%, psi | 1100 | 980 | — | 1050 |
| Tensile strength, psi | 1650 | 1600 | 1300 | 1650 |
| Elongation at break, % | 130 | 160 | 90 | 150 |
| Compression set test-1 | 22 | 18 | 13 | 30 |
| Compression set test-2 | 23 | 23 | 23 | 29 |

In Table II compositions, and in the other compositions described below, (unless specified otherwise) the fluoroelastomer, carbon black, and procedures for blending and testing are the same as for the Table I compositions.

EXAMPLE 8

A composition having similar utility to the composition of Example 7 is prepared by repeating Example 7 except the hydroquinone is replaced with 1.5 parts of isopropylidene-bis(4-hydroxybenzene). Test results are shown in Table III. Compression set test-1A is the same as test-1 except the time is 336 hours. The Press/Heat Cycle in Example 8 is: press-cure 7 minutes at 177°C. and oven post-cure 24 hours at 232°C.

TABLE III

| Example | 8 | 9 | 10 | 11 |
|---|---|---|---|---|
| ODR Cure Test | | | | |
| 2.5 | 2 | 2 | 2 | 2 |
| 5 | 40 | 3 | 4 | 3 |
| 7.5 | 94 | 13 | 29 | 64 |
| 10 | 96 | 65 | 93 | 83 |
| 15 | 97 | 86 | 109 | 86 |
| 20 | 98 | 89 | 111 | 87 |
| 30 | 98 | 91 | 112 | 87 |
| After Press/Heat Cycle | | | | |
| Shore hardness | 74 | 71 | 74 | 79 |
| Modulus-100%, psi | 800 | 700 | 1050 | 780 |
| Tensile strength, psi | 1150 | 1450 | 1350 | 1500 |
| Elongation at break, % | 125 | 170 | 125 | 175 |
| Compression set test-1 | 28 | — | — | — |
| Compression set test-1A | 62 | — | — | — |
| Compression set test-2 | 28 | 16 | 18 | 19 |

EXAMPLES 9-11

Compositions having similar utility to the compositions of Table I (with test results shown in Table III) are prepared by repeating Example 1 except:

In Example 9 the accelerator is composed of 0.75 part of benzyl triphenyl phosphonium chloride absorbed on calcium silicate in a weight ratio of about 67:33; and the amount of hydroquinone is 1.0 part; and the Press/Heat Cycle is: press-cure 8 minutes at 177°C. and oven post-cure 24 hours at 232°C.

In Example 10 the accelerator and the Press/Heat Cycle are the same as in Example 9; and the hydroquinone is replaced with 1.25 parts of 2-methylresorcinol.

In Example 11 the accelerator is the same as in Example 9 except the amount used is 1.0 part; the hydroquinone is replaced with 2.0 parts of hexafluoroisopropylidene-bis (4-hydroxybenzene); and the Press/Heat Cycle is: press-cure 5 minutes at about 185°C. and oven post-cure 24 hours at 232°C.

Other useful compositions of the invention can be prepared by repeating Example 9 except the hydroquinone is replaced with 2.5 parts of isopropylidene-bis(4-hydroxy-3-methylbenzene), or with 1.65 parts of t-butyl hydroquinone.

A useful composition of this invention is also obtained when only the fluoroelastomer and accelerator components of Example 11 are mixed in the proportions used in that example. As mentioned previously, the resulting 2-component mixture can later be blended with various additives (e.g., the other ingredients of Example 11) before the composition is made into cured end-products. A 3-component composition in which the Example 11 metal compound or polyhydroxylic compound is blended with the 2-component mixture in the proportions shown is also a useful article of commerce which can be stored, shipped, and later blended with certain additives before it is made into cured end-products.

EXAMPLES 12-19

Additional useful compositions of the present invention on which test results similar to those shown above are obtained are prepared by repeating Example 2 except:

In Example 12 the amount of magnesia is 2 parts; the accelerator's active ingredient is methoxyethoxyethyl trioctyl phosphonium chloride; as in Example 2, the accelerator is a composite material (67:33 ratio of active ingredient to calcium silicate).

In Example 13 the amount of magnesia is 2 parts; the accelerator's active ingredient is tetraoctyl phosphonium bromide; and the amount of accelerator is 0.7 part.

In Example 14 the accelerator's active ingredient is benzyl trioctyl phosphonium chloride.

In Example 15 the accelerator's active ingredient is butyl trioctyl phosphonium bromide.

In Example 16 the amount of composite accelerator is 0.75 part, and its active ingredient is tetrabutyl phosphonium chloride; and the amount of hydroquinone is 1.0 part.

In Example 17 the amount of accelerator is 0.7 part, and its active ingredient is m-trifluoromethylbenzyl trioctyl phosphonium bromide.

In Example 18 the amount of accelerator is 1.0 part, and its active ingredient is 2,2,3,3-tetrafluoropropyl trioctyl phosphonium chloride.

In Example 19 the amount of accelerator is 1.2 parts, and its active ingredient is 2,2,3,3,4,4,5,5-octafluoropentyl trioctyl phosphonium chloride.

EXAMPLE 20-25

Further useful compositions of the invention on which similarly desirable test results are obtained (as shown in Table IV) are prepared according to the Example 2 formula except (a) the amount of accelerator in Example 22 is 0.7 part; (b) the hydroquinone in each composition is replaced with 2 parts of hexafluoroisopropylidene-bis(4-hydroxybenzene); and (c) the accelerators are as follows:

| Example | Accelerator - active ingredient |
|---|---|
| 20 | 4-methylbenzyl triphenyl phosphonium chloride |
| 21 | 4-chlorobenzyl triphenyl phosphonium chloride |
| 22 | diphenylmethyl triphenyl phosphonium chloride |
| 23 | m-trifluoromethylbenzyl triphenyl phosphonium chloride |
| 24 | 1-naphylmethyl triphenyl phosphonium chloride |
| 25 | methyl triphenyl arsonium tetrafluoroborate |

The Press/Heat Cycle is: press-cure 7 minutes at 185°C. and oven post-cure 24 hours at 232°C.

methyl ethyl ketone and various other solvents normally used to dissolve the uncured fluoroelastomer. This is quite surprising since the dry mixture made on the roll mill can be stored for long periods (e.g., several weeks) at 25°C. without curing.

EXAMPLE 27

This example illustrates the use of another accelerator. Another composition on which favorable test results are obtained is prepared by mixing 100 parts of the fluoroelastomer, 4 parts of magnesia, 4 parts of calcium hydroxide, 30 parts of carbon black, 2 parts of the Example 11 cross-linking agent, which is hexafluoroisopropylidene-bis(4-hydroxybenzene), and, as the accelerator, 0.6 part of benzyl-tris(4-methoxyphenyl)-phosphonium chloride. The accelerator is added without being combined with calcium silicate or the like.

TABLE IV

| Example | 20 | 21 | 22 | 23 | 24 | 25 |
|---|---|---|---|---|---|---|
| ODR Cure Test | | | | | | |
| 2.5 | 5 | 3 | 4 | 3 | 2 | 2 |
| 5 | 75 | 11 | 89 | 30 | 4 | 80 |
| 7.5 | 83 | 84 | 91 | 79 | 72 | 88 |
| 10 | 84 | 86 | 92 | 79 | 77 | 89 |
| 30 | 86 | 88 | 92 | 79 | 79 | 89 |
| After Press/Heat Cycle | | | | | | |
| Shore hardness | 74 | 75 | 71 | 71 | 71 | 69 |
| Modulus-100%, psi | 800 | 710 | 760 | 750 | 700 | 660 |
| Tensile strength, psi | 1250 | 1350 | 1600 | 1650 | 1650 | 1550 |
| Elongation at break, % | 145 | 165 | 180 | 175 | 190 | 185 |
| Compression set test-1 | 21 | 19 | 17 | 15 | 16 | 17 |
| Compression set test-2 | 25 | 14 | 19 | 18 | 17 | 18 |

Other useful compositions of the invention can be prepared in substantially the same manner as in Example 20 except all or part of the accelerator (active ingredient) is replaced with one or more of the following compounds:

2-cyanobenzyl triphenyl phosphonium bromide
4-cyanobutyl triphenyl phosphonium bromide
2,6-dichlorobenzyl triphenyl phosphonium bromide
α-carbethoxybenzyl triphenyl phosphonium bromide
carbethoxymethyl triphenyl phosphonium bromide
1-carbethoxyethyl triphenyl phosphonium bromide
methoxymethyl triphenyl phosphonium chloride
allyloxymethyl triphenyl phosphonium chloride
allyl triphenyl phosphonium chloride
tetraphenyl arsonium chloride
tetraphenyl stibonium bromide

EXAMPLE 26

A liquid composition useful in preparing heat and solvent resistant adhesive layers and coatings is made by mixing on a 2-roll mill: 200 grams of the fluoroelastomer used in Example 1, 8 grams of magnesia, 8 grams of calcium hydroxide, 1 gram of benzyl triphenyl phosphonium chloride and 4 grams of hexafluoroisopropylidene-bis(4-hydroxybenzene); and then mixing 26.5 grams of the resulting blend with 160 ml. of methyl ethyl ketone at 25°C. until the fluoroelastomer is dissolved and a uniform liquid composition is obtained.

When a thin layer of this composition is applied to a substrate (e.g., glass or fabric) and dried at 25°C. for 14 hours, the dried coating is substantially insoluble in

EXAMPLES 28–42

These examples illustrate the use of other cross-linking agents within component D as described above. Other compositions on which favorable test results are obtained are prepared by mixing 100 parts of the fluoroelastomer, 4 parts of magnesia, 4 parts of calcium hydroxide, 30 parts of carbon black, the amount of each cross-linking agent listed below, and as the accelerator (in uncombined form as in Example 27) 0.8 part of benzyl triphenyl phosphonium chloride, except the amount of accelerator in Example 31 is 2.5 parts and in Example 35 it is 1.0 part. The Example 30 cross-linking agent is especially desirable when a very fast rate of cure is desired.

| Example | Cross-linking Agent | Parts |
|---|---|---|
| 28 | 1,4,9,10-tetrahydroxyanthracene | 1.5 |
| 29 | 2,2',4,4'-tetrahydroxybenzophenone | 1.5 |
| 30 | 2,4-dihydroxybenzophenone | 1.5 |
| 31 | 2,4-dihydroxybenzoic acid | 1.4 |
| 32 | 4,4'-dihydroxytetraphenylmethane | 2.0 |
| 33 | 2,6-dihydroxyanthraquinone | 2.2 |
| 34 | 3,6-dihydroxyxanthone | 1.5 |
| 35 | pyromellitic-bis-(p-hydroxyphenylimide) | 3.0 |
| 36 | 2,4-dihydroxyacetophenone | 1.0 |
| 37 | 4,4'-dihydroxybenzophenone | 1.5 |
| 38 | 4,4'-dihydroxydiphenyl sulfoxide | 2.0 |
| 39 | 4,4'-dihydroxydiphenyl sulfone | 2.0 |
| 40 | 2,4-dibenzoylresorcinol | 2.0 |
| 41 | 2,4,5-trihydroxybutyrophenone | 1.5 |
| 42 | 2,4-dihydroxybenzaldehyde | 1.5 |

The cross-linking agents of Examples 30, 31, and 39 give especially good performance at reasonable cost.

Example 43

This example illustrates a highly preferred embodiment of the novel composition for use in applications requiring exceptional resistance to undue rise in compression set values when cured O-rings and the like are subjected to compression at high temperatures for extended periods of time. The composition is prepared by mixing the following ingredients on a 2-roll mill whose rolls are at about 25°C.: 100 parts of the fluoroelastomer of Example 1, 4 parts of magnesia, 2 parts of calcium hydroxide, 30 parts of MT carbon black, 0.5 parts of the accelerator benzyl triphenyl phosphonium chloride (uncombined as in Example 27), and 2 parts of the cross-linking agent hexafluoroisopropylidene-bis(4-hydroxybenzene).

It will be noted that the Example 43 composition employs a curing system comprised of an aralkyl triarylphosphonium compound accelerator in combination with a polyhydroxylic aromatic compound cross-linking agent which is a bisphenol having an oxidation potential of 2.07 volts. The group connecting the two rings of the bisphenol formula is an electron-withdrawing group (perfluorinated alkylidene). Test results on this composition and others that follow are shown below in Table V.

The ODR Cure Test is at 169°C.; the test method is described in Example 1. The press/heat cycle is: press-cure 30 minutes at 169°C., and circulating air oven post-cure 20 hours at 260°C. after allowing 4 hours for the temperature of the oven and samples to reach 260°C. The compression set values are obtained by subjecting O-rings to compression at 204°C. according to the Example 1 method for the number of hours indicated in Table V. Furthe remarks on the results obtained in Example 43 are given in Example 44.

EXAMPLE 44

Example 43 is repeated except the cross-linking agent used in Example 43 is replaced with enough hydroquinone (1 part) to provide a suitable rate of cure. Hydroquinone is a polyhydroxylic aromatic compound having an oxidation potential well below 1.5 volts and having no electron-withdrawing substituent on the aromatic ring. Test results are shown in Table V. It will be apparent that the compression set value of the Example 44 composition is 20 percent higher than that of the Example 43 composition after 70 hours and 48 percent higher after 336 hours. Thus, the compression set values obtained in Example 43 are unexpectedly beneficial even when compared with the values obtained for the Example 44 composition (which itself is a very useful composition representing a significant advance in the art). The composition of Example 43 would be highly useful in some applications where the Example 44 composition would have little or no utility.

EXAMPLE 45

Example 43 is repeated except the amount of magnesia in the composition is 10 parts instead of 4 parts, and the ODR Cure Test is at 177°C. Test results are shown in Table V.

EXAMPLE 46

Example 45 is repeated except the cross-linking agent used in that example is replaced with 1 part of hydroquinone. Test results are shown in Table V. The compression set value of the Example 46 composition is 42 percent higher than that of the Example 45 composition after 70 hours and 46 percent higher after 169 hours. It is quite surprising that the compression set values obtained in Example 45 are so much better than those obtained in Example 46 since the composition of Example 46 itself is a very useful composition representing a significant advance in the art.

TABLE V

| Example | 43 | 44 | 45 | 46 | 47 | 48 |
|---|---|---|---|---|---|---|
| ODR Cure Test | | | | | | |
| 5 | 2 | 2 | 3 | 4 | 7 | 5 |
| 10 | 5 | 12 | 27 | 9 | 87 | 37 |
| 15 | 78 | 87 | 68 | 30 | 94 | 76 |
| 30 | 106 | 95 | 77 | 68 | 100 | 90 |
| Min. to reading of 30 | 13.6 | 10.4 | 10 | 15 | 7 | 9 |
| After Press/Heat Cycle | | | | | | |
| Shore hardness | 71 | 72 | 72 | 74 | 77 | 75 |
| Modulus-100%, psi | 860 | 900 | 950 | 900 | 1350 | 1450 |
| Tensile strength, psi | 1800 | 1750 | 2000 | 1800 | 2050 | 1800 |
| Elongation at break, % | 170 | 160 | 153 | 160 | 133 | 113 |
| Compression set, hours | | | | | | |
| 70 | 15 | 18 | 19 | 27 | 20 | 21 |
| 168 | 21 | 32 | 26 | 38 | 30 | 32 |
| 336 | 29 | 43 | 36 | 50 | 44 | 46 |
| 672 | 39 | 56 | 54 | 69 | 62 | 70 |
| 1008 | 50 | 70 | | | | |

EXAMPLE 47

Example 45 is repeated except the accelerator used in that example is replaced with tetrabutyl phosphonium bromide (a tetraalkyl phosphonium compound) in an amount sufficient to provide a suitable rate of cure (0.53 part). Test results are shown in Table V. It will be noted that the compression set value of the Example 47 composition is about 15 percent higher than that of the Example 45 composition after 168 hours and about 22 percent higher after 336 hours.

When O-rings are prepared in about the same manner as described in Example 47 except the accelerator used is methyl trioctyl phosphonium dimethyl phosphate (another tetraalkyl phosphonium compound), again the compression set values are much higher than those obtained with the Example 45 composition when tested for a prolonged period at a relatively high temperature.

EXAMPLE 48

Example 45 is repeated except the Example 45 cross-linking agent is replaced with 1 part of hydroquinone and the Example 45 accelerator is replaced with 0.53 part of tetrabutyl phosphonium bromide. Test results are shown in Table V. It will be noted that the compression set value of the Example 48 composition is about 23 percent higher than that of the Example 45 composition after 168 hours, about 28 percent higher after 336 hours, and about 30 percent higher after 672 hours.

EXAMPLE 49

A first batch of O-rings is prepared and tested as described in Example 43 except: the composition has a magnesia content of 3 parts, a calcium hydroxide content of 6 parts, and a cross-linking agent content of 2.4 parts; the press/heat cycle employs a press-cure of 7 minutes at 177°C. and an oven post-cure of 24 hours at 232°C.; and the compression set test temperature is 200°C. After 70 hours in the compression set test the compression set value is 12, and after 336 hours, the value is 26.

A second batch of O-rings is prepared and tested in the same manner as the first batch except the hexafluoroisopropylidene-bis(4-hydroxybenzene) cross-linking agent is replaced with 1 part of hydroquinone. The 70-hour compression set value is 18 (50 percent higher), and the 336-hour compression set value is 41, or 58 percent higher than with the first batch.

Because of their unexpectedly superior compression set properties, the O-rings of the first batch would be useful in certain demanding applications where the O-rings of the second batch would have little or no utility. It will be recognized, however, that the O-rings of the second batch would be highly useful in numerous applications where many types of prior art O-rings would have little or no utility.

I claim:

1. A fluoroelastomer composition comprising
   A. an elastomeric copolymer of vinylidene fluoride and at least one other fluorinated monomer,
   B. as a vulcanization accelerator, a quaternary phosphonium compound which is an alkyl- or aralkyl- triarylphosphonium compound,
   C. a metal compound selected from the group consisting of divalent metal oxides, divalent metal hydroxides, and mixtures of such oxides or hydroxides with metal salts of weak acids, and
   D. as a cross-linking agent, a compound selected from the group:
      dihydroxy-, trihydroxy- and tetrahydroxy- -benzenes, -naphthalenes and -anthracenes having an aromatic ring which bears an electron-withdrawing substituent, and
      bisphenols of the formula

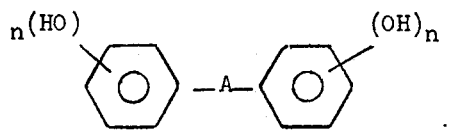

wherein A is an electron-withdrawing group, and n is 1 or 2;

said composition containing for each 100 parts by weight of component A, about 0.1–3.0 parts by weight of component B, about 1–15 parts by weight of component C and about 0.1–5.0 parts by weight of component D.

2. A composition according to claim 1 wherein A is carbonyl, sulfinyl, sulfonyl, perfluorinated alkylene or perfluorinated alkylidene.

3. A composition according to claim 1 wherein component B is benzyl triphenyl phosphonium chloride.

4. A composition according to claim 1 wherein component B is benzyl triphenyl phosphonium bromide.

5. A composition according to claim 3 wherein component D is 2,4-dihydroxybenzophenone.

6. A composition according to claim 3 wherein component D is a compound having an oxidation potential of about 1.6–2.2 volts.

7. A composition according to claim 6 wherein component D is hexafluoroisopropylidene-bis(4-hydroxybenzene).

8. A composition according to claim 6 wherein component D is 4,4'-dihydroxydiphenyl sulfone.

9. A composition according to claim 6 wherein component D is 4,4'-dihydroxybenzophenone.

10. A composition according to claim 1 which also contains a liquid solvent for component A, said solvent being in a blended state with the other components and present in an amount such that the composition is in the form of a liquid.

11. A composition according to claim 10 wherein said solvent is selected from the group: acetone, methylethyl ketone, ethyl acetate, amyl acetate, and tetrahydrofuran.

* * * * *